United States Patent
Sjostedt

(10) Patent No.: US 10,780,671 B2
(45) Date of Patent: Sep. 22, 2020

(54) FILAMENT WOUND COMPOSITE TOOLS AND RELATED METHODS

(71) Applicant: CCDI COMPOSITES, INC., Santa Ana, CA (US)

(72) Inventor: Rob Sjostedt, Foothill Ranch, CA (US)

(73) Assignee: CCDI COMPOSITES, INC., Santa Ana, CA (US)

( * ) Notice: Subject to any disclaimer, the term of this patent is extended or adjusted under 35 U.S.C. 154(b) by 1181 days.

(21) Appl. No.: 14/194,420

(22) Filed: Feb. 28, 2014

(65) Prior Publication Data

US 2014/0248448 A1 Sep. 4, 2014

Related U.S. Application Data

(60) Provisional application No. 61/771,258, filed on Mar. 1, 2013.

(51) Int. Cl.
*B32B 5/12* (2006.01)
*B32B 1/08* (2006.01)
*B32B 5/26* (2006.01)

(52) U.S. Cl.
CPC ............... *B32B 5/12* (2013.01); *B32B 1/08* (2013.01); *B32B 5/26* (2013.01); *B32B 2250/44* (2013.01); *B32B 2260/023* (2013.01); *B32B 2262/101* (2013.01); *Y10T 428/13* (2015.01); *Y10T 428/249922* (2015.04)

(58) Field of Classification Search
CPC ......... B32B 5/12; B32B 1/08; B32B 2250/44; B32B 2260/023; B32B 2262/101; B32B 5/26; Y10T 428/13; Y10T 428/249922; Y10T 442/614; Y10T 442/626
See application file for complete search history.

(56) References Cited

U.S. PATENT DOCUMENTS

| | | | | |
|---|---|---|---|---|
| 4,802,331 A | * | 2/1989 | Klink | D02G 3/18 57/208 |
| 7,735,549 B1 | * | 6/2010 | Nish | E21B 33/1293 166/134 |
| 2013/0072335 A1 | * | 3/2013 | Yomoda | B29D 29/08 474/205 |

* cited by examiner

*Primary Examiner* — Yan Lan
(74) *Attorney, Agent, or Firm* — Klein, O'Neill & Singh, LLP

(57) ABSTRACT

Composite products and related methods are disclosed. In some examples, methods of filament winding composite components and products, such as a sleeve and/or a mandrel for use in down-hole applications, are disclosed. The winding of components can involve using a percentage of fiber roving strands that are blown during manufacture such that they have fiber loops that when wound as layers forms bridges across the discrete layers to enhance the interlaminar strength of the composite product.

15 Claims, 6 Drawing Sheets

FILAMENT WOUND COMPOSITE TOOLS AND RELATED METHODS

BACKGROUND

In oil and gas well completion operations, frac and/or bridge plugs are necessary for zonal isolation and multi-zone hydraulic fracturing processes. The advantages of frac and bridge plugs made primarily from composite materials is well established since these products significantly reduce drill-out (removal) time compared to drill out time for all metallic frac and bridge plugs. However, as drilling for oil and gas extends deeper and/or hydraulic fracking pressures increase, composite frac and bridge plugs are subject to higher pressures and operating temperatures.

With higher pressures and operating temperatures, increased stresses can be expected on frac and bridge plug products resulting in a corresponding need to meet more stringent demands, which can also mean increased in manufacturing costs. But as use of composite frac and bridge plug products increases, the desire to minimize manufacturing costs also increases. As a result, solutions to improve the strength of a composite frac or bridge plug product must also account for cost.

Typical frac and bridge plugs have upper and lower sleeves that are mounted or connected to a tubular central mandrel. For different manufacturers, the upper and lower sleeves may have other names or references, such as being called upper and lower support members, retaining bands, and loading rings. In general, the upper and lower sleeves retain the plug packing elements and slip elements in between the two sleeves to both lock the plug to the well pipe casing and seal the casing so hydraulic fracking pressurization, logging or other procedures requiring well isolation can occur. When the frac ball is dropped (or pressure is applied in the case of a bridge plug) and hydraulic fracking fluid pressure is applied, the hydrostatic pressure above the ball is trying to push the composite mandrel through the packing elements and down the well casing.

Both frac plugs and bridge plugs typically have an enlarged section located at or near one or both ends of the composite tubular mandrel, just above the packing and wedge elements, to keep the plug from being blown down the well casing when pressure is applied. This enlarged section of the mandrel is typically made by one of two methods. The first approach is to adhesively bond and/or mechanically pin a composite cylindrical sleeve over the composite tubular mandrel to-retain the packing elements and act as a stop to hold the frac plug together and allow it to perform its functions. The second approach is to filament wind or laminate the enlarged section at the same time that the composite tubular mandrel is made. In other words, make the enlarged section integral to the mandrel. Bridge plugs must have an equally strong sleeve or stop at both ends of the mandrel to retain the packing elements and hold the mandrel in place since the pressure on a bridge plug can be either above or below the plug.

Generally speaking, composite frac and bridge plugs can be made by two basic approaches. One approach is to convolute wrap woven fiberglass (or other woven composite materials) combined with resin or use woven fabric pre-impregnated with resin to make the tubular mandrel and/or sleeves. A second method, which generally considered the lower cost method, is to filament wind the mandrel and sleeves to then secure them together using adhesive with or without pins or to filament wind the mandrel with an integral upper enlarged area. Filament winding is especially attractive as a process to make frac and bridge plugs because it is low cost. Filament winding is low cost because it is an automated process to lay down composite materials and because it uses low cost fiber strand materials versus woven fabrics and resin pre-impregnated woven fabric materials.

While filament winding is attractive because it is a cost effective means to make composite frac and bridge plugs, further consideration should be made when utilizing them for higher pressure temperature well completion applications. When a tubular product such as a frac or bridge plug is made by the filament winding process, layers of fiber and resin are progressively "wound" in place. This means that the layers are discrete and one on top of another. For example, a +/−45 degree layer may be first wound onto the tooling used to make the frac or bridge plug. While the first layer may have inter-weaving of the fibers as the material is laid down in +45 and −45 orientation, the next layer is applied over the top much like the growth rings of a tree. Resin is what holds the discrete layers together for a filament wound frac or bridge plug. Even the best resins available to date, typically tetra-functional epoxies, have a limitation in shear strength at elevated temperatures experienced in down-hole completions.

If the enlarged upper section of a frac or bridge plug mandrel is made by filament winding, adequate interlaminar shear strength between the plies of material for higher pressure and temperature hydraulic fracking operations can pose a challenge. Products made by this method are generally satisfactory for down-hole temperatures in the 250° F. range and fracking pressures of up to 8,000 psi. For higher temperature and pressure well completion applications, interlaminar shear failures in the upper enlarged area of the mandrel are not uncommon.

SUMMARY

It would be desirable to increase the interlaminar shear strength between layers of filament wound elongated shafts, such as a mandrel with a hollow bore. For example, if enlarged upper sections of mandrels for frac and bridge plugs had increased interlaminar shear strength, they can be used in temperature applications greater than 250° F. and in pressure applications over 8,000 psi with less or no interlaminar shear failures. It would also be desirable to increase the inter-laminar shear strength of tubular sleeves that are made by filament winding and used to retain the packing elements and wedge slips and restrain the plug from being blown down the well casing.

Even convolute wrapped woven cloth composite frac and bridge plug products suffer from an inherent weakness in terms of interlaminar shear between the layers of woven cloth. A cost effective means to increase the interlaminar shear between layers of cloth would also be preferred.

The present method and system may be practiced by filament winding composite frac or bridge plug down-hole tool components using a percentage of fiber roving strands that are blown during manufacture such that they have fiber loops that when wound as layers can bridge across the discrete layers of composite materials to enhance the interlaminar strength of the frac or bridge plug composite. In other words, the layer or space between two adjacent wrapped woven cloth materials and two adjacent filament wound layers can be strengthened by providing blown fiber roving strands that can interlock with the two layers and the resin to form a much stronger interlaminar layer than prior art interlaminar layers using only resin and no blown fiber roving strands.

Aspects of the present disclosure include a mandrel made of a composite material and by a filament winding process wherein a portion of fiber rovings used in the filament winding process comprises strand loops bridging between filament wound layers of the wound mandrel to enhance interlaminar shear strength.

A further aspect wherein the fiber rovings comprise fiber bands each made from a plurality of standard roving strands and a plurality of blown roving strands with the plurality of blown roving strands each comprising a plurality of strand loops.

The mandrel of the present disclosure wherein a first layer of fiber band can be wound at a +45 degree angle.

The mandrel of the present disclosure wherein a second layer of fiber band can be wound at a −45 degree angle.

A further aspect of the present disclosure is a mandrel that is part of a frac or bridge plug down-hole tool.

To hold the composite materials together, a further feature is a resin matrix that binds the different bands together.

A yet further aspect of the present disclosure is a tubular sleeve for use in down-hole applications, said tubular sleeve made from a composite material and by a filament winding process wherein a portion of fiber rovings used in the filament winding process is blown when made to create a percentage of unequal length strands in the roving so that these fiber rovings define strand loops that bridge between filament wound layers of the sleeve to enhance inter-laminar shear strength.

A further feature of the disclosed tubular sleeve is one wherein the sleeve is formed with a mandrel and wherein both the sleeve and the mandrel are wound with fiber bands comprising a percentage of blown roving strands in combination with standard roving stands.

A method of filament winding a down-hole product comprising using blown glass fiber rovings comprising strand loops with standard roving strands as fiber bands for winding, and winding the fiber bands to form the down-hole product having enhanced interlaminar shear strength.

The method further comprising forming an enlarged sleeve at an end of the down-hole product, the enlarged sleeve comprising a composite layer having blown glass fiber rovings comprising strand loops with standard roving strands.

A still further feature of the present application is a method to increase the strength of a composite material for a down-hole frac or bridge plug having threads machined into the product to engage a setting tool or to assemble a sleeve onto the plug mandrel, said method comprising using blown roving strands in combination with standard roving strands in the area of the threads.

Yet another aspect of the present disclosure is a method of incorporating blown roving strands incrementally between layers of convolute woven cloth to enhance the interlaminar shear strength between cloth layers.

A still additional feature of the present disclosure is a mandrel made of a composite material. In accordance with aspects of the present device, system, and method, the mandrel can comprise fiber bands forming filament wound layers defining an elongated body; a plurality of the fiber bands comprising strand loops surrounding a core bridging between the filament wound layers of the elongated body to enhance interlaminar shear strength; and resin for binding the filament wound layers.

The mandrel wherein the fiber bands can comprise a plurality of standard roving strands and a plurality of blown roving strands with the plurality of blown roving strands each comprising the strand loops.

The mandrel wherein a first layer of fiber band can be wound at 86 degree angle relative to a lengthwise axis of the elongate body to within +/−5 degrees.

The mandrel wherein a second layer of fiber band can be wound at −45 degree angle relative to a lengthwise axis of the elongate body.

The mandrel can be part of a frac or bridge plug down-hole tool.

The mandrel can further comprise a resin matrix that binds the different bands together.

The mandrel can further comprise a sleeve wound to the mandrel and wherein the sleeve comprises strand loops bridging between filament wound layers for forming the sleeve.

Yet another feature of the present disclosure is a tubular sleeve made of a composite material. In embodiments of the present disclosure, the sleeve can comprise fiber bands forming filament wound layers defining an elongated body comprising an exterior surface and an interior surface defining a bore; a plurality of the fiber bands comprising strand loops surrounding a core bridging between the filament wound layers of the elongated body to enhance interlaminar shear strength; said strand loops surrounding a core formed by strands of unequal lengths; and resin for binding the filament wound layers.

The tubular sleeve wherein the sleeve can be formed with a mandrel and wherein both the sleeve and the mandrel are wound with fiber bands comprising a percentage of blown roving strands in combination with standard roving stands.

The tubular sleeve can be part of a frac or bridge plug down-hole tool.

The tubular sleeve wherein the ratio of blown roving strands to standard roving strands can be 5% to 95% blown roving strands with standard roving strands making up the balance.

The tubular sleeve wherein the elongated body can have a thickness of 0.25 inches to 1.5 inches.

The tubular sleeve wherein a first layer of the filament wound layers can be formed at a +/−45 degree layer relative to a lengthwise axis of the elongate body.

The tubular sleeve wherein a first layer of the filament wound layers can be formed at 86 degree angle relative to a lengthwise axis of the elongate body to within +/−5 degrees.

An additional feature of the present disclosure is a method of filament winding a down-hole product. Although down-hole is mentioned, the composite product may be used in above-hole applications. As disclosed, the method comprising using blown glass fiber roving strands comprising strand loops with standard roving strands as fiber bands for winding filament wound layers to form a body, and winding the fiber bands to form the down-hole product having enhanced interlaminar shear strength.

The method can further comprise forming an enlarged sleeve at an end of the down-hole product, the enlarged sleeve comprising a composite layer having blown glass fiber roving strands comprising strand loops with standard roving strands.

The method wherein the down-hole product can be a mandrel comprising an elongated body comprising a bore.

The method can further comprise a final over-layer wound at a different angle around the filament wound layers.

The method wherein the final over-layer is wound at around a 3 to 10 degree angle relative to a lengthwise axis of the body.

The method wherein the down-hole product can be a sleeve comprising the body with a bore.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of high strength composite components made using a percentage of blown fiber roving strands provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
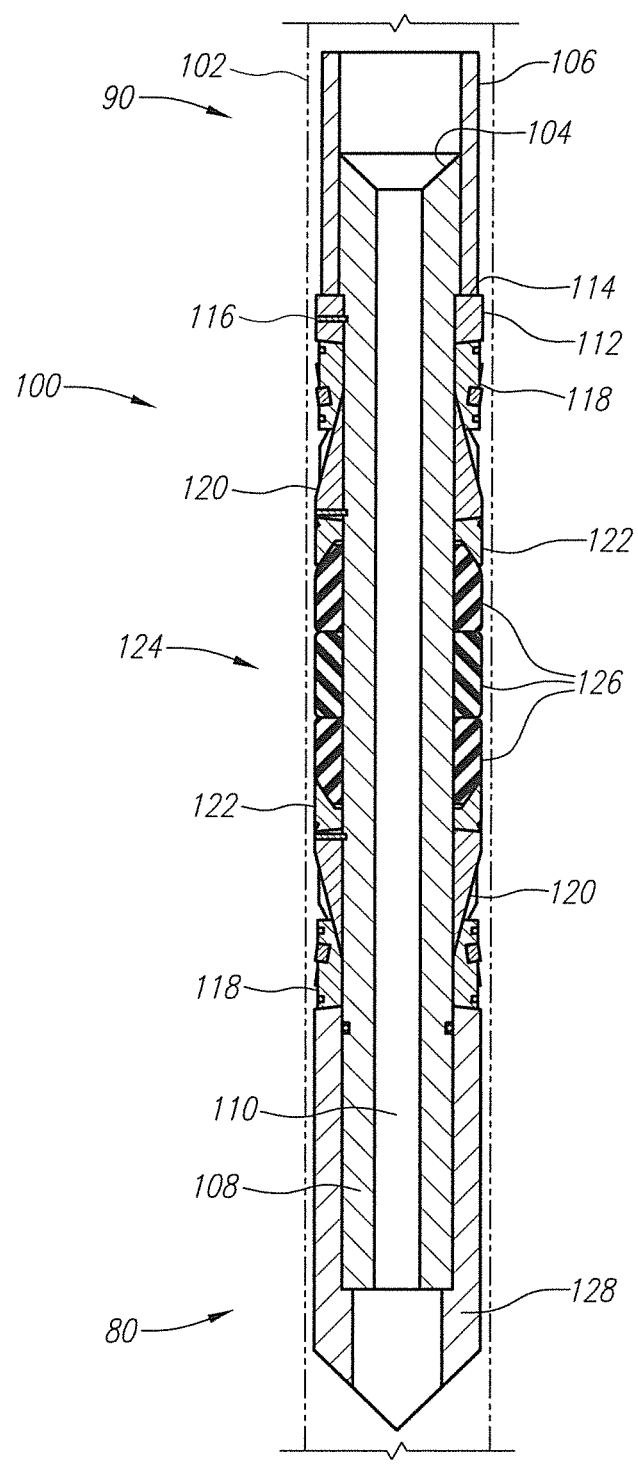
FIG. 1 is a downhole tool formed, at least in part, in accordance with the methods and techniques of the present disclosure.

With reference now to FIG. 1, a downhole tool 100 provided in accordance with aspects of the present disclosure is shown situated in a well bore 102, which can be a production casing, an intermediate casing, or a surface casing. The downhole tool 100 is a frac plug system and includes a ball seat 104 for receiving a closing ball or frac ball (not shown). However, in other embodiments, the downhole tool can be a bridge plug that utilizes the high strength winding method and system of the present disclosure involving blow roving strands.

As shown, the tool 100 has a first end 90 and a second end 80 and a mandrel 108 running through the tool, which may be a composite formed by winding roving strands comprising loops for bridging between adjacent layers. A sleeve 106 is shown attached to the mandrel 108, which has a bore 110 for fluid flow. In one example, the sleeve 106 is attached to the mandrel 108 without any pin, i.e., a pin-less connection. In alternative embodiments, one or more pins are used to secure the sleeve and the mandrel in combination with adhesive, as further discussed below. As further discussed below, the sleeve 106 may also be made from a composite material comprising blown roving strands.

A spacer ring 112 is abutted against a shoulder 114 defined by the sleeve 106 and optionally pinned to the sleeve with one or more pins 116. The spacer ring 112 supports a slip back up or slip ring 118, which has a tapered interior surface for riding up against a tapered surface of the slip wedge 120 to bite against the casing when set. A second set of slip wedge 120 and slip ring 118 is provided closer to the second end 80 for gripping the tool assembly 100 against the casing.

A packer shoe 122 is provided adjacent the packer assembly 124, which in the current embodiment has three packer rings 126. In other examples, a different number of packer rings is used, such as one, two, or more than three. The upper and lower packer shoes 122 are configured to compress the packer assembly 124 when the downhole tool 100 is set, which causes the three packer rings 126 to expand outwardly away from the mandrel 108 to seal against the casing.

A nose section 128 is provided at the second end 80 of the downhole tool 100, which may be used to engage a crown (not shown) of another downhole tool. In the present embodiment, the nose section 128 is attached to the mandrel 108 without any pin, i.e., a pin-less connection. In alternative embodiments, one or more pins are used to secure the nose section 128 and the mandrel in combination with adhesive, as further discussed below. In yet other examples, the nose section 128 is threaded to the mandrel 108.

Figure 2:
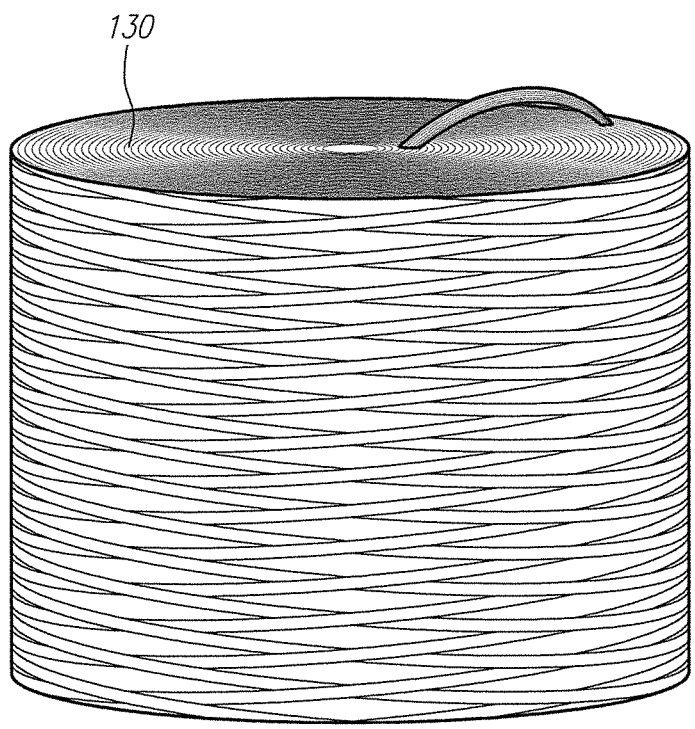
FIG. 2 is a side view showing a roll of composite roving material.
Figure 3:
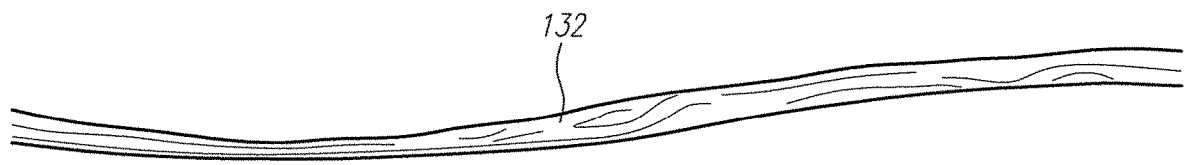
FIG. 3 is a side view showing a section of a standard composite or fiber roving strands.
Figure 4:
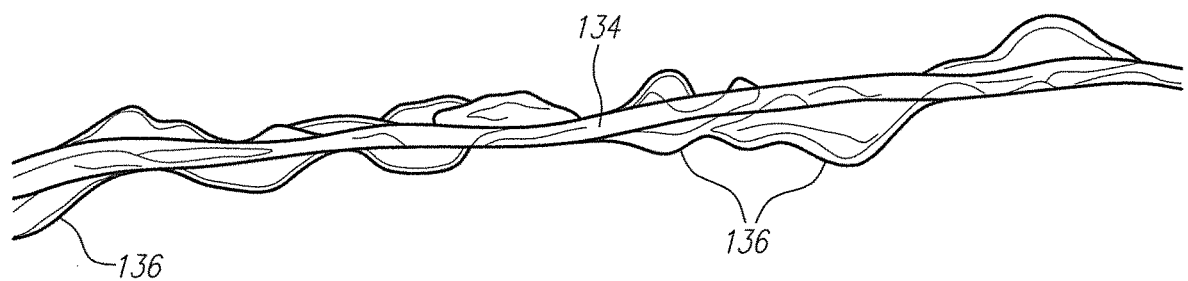
FIG. 4 is a side view showing a section of blown fiber roving strands.

Fiberglass strands called rovings are used for filament winding, which may be used to form the mandrel 108 and/or the sleeve 106 described herein. In other examples, other materials such as carbon fiber is used in conjunction with or instead blown glass roving. The rovings for winding can be bundled strands or woven roving cloth, in which large strands are weaved into sheets. Typical rovings are made from a collection of glass filaments. In other examples, other composite materials are used, such as carbon and aramid. The filaments are smooth, have relatively constant diameter, generally equal in length, and are bundled together to make a roll of roving material 130, as shown in FIG. 2. To enhance interlaminar shear strength between the wound layers of rovings, a process is disclosed whereby the roving is "blow" or "blown" so that the fiber produced during the manufacturing of the filaments form filament loops that stand out from the roving. This is analogous to bundling a plurality of strands with length X and strands with length X+Y and forcing the ends of both types to align so that the longer strands fold randomly to form filament loops. A typical "blown roving" will have about 10% to 30% of the strands that stand out from the basic roving bundle as loops. When one examines a standard roving 132, it is smooth, such as that shown in FIG. 3. When on examines a blown roving 134 it is fuzzy in appearance, such as that shown in FIG. 4. The fuzzy appearance is caused, at least in part, by a plurality of loops 136 that undulate around a general core. The loops 136 are generally continuous about the length of the roving material. However, it is possible to have broken stray strands.

Figure 5:
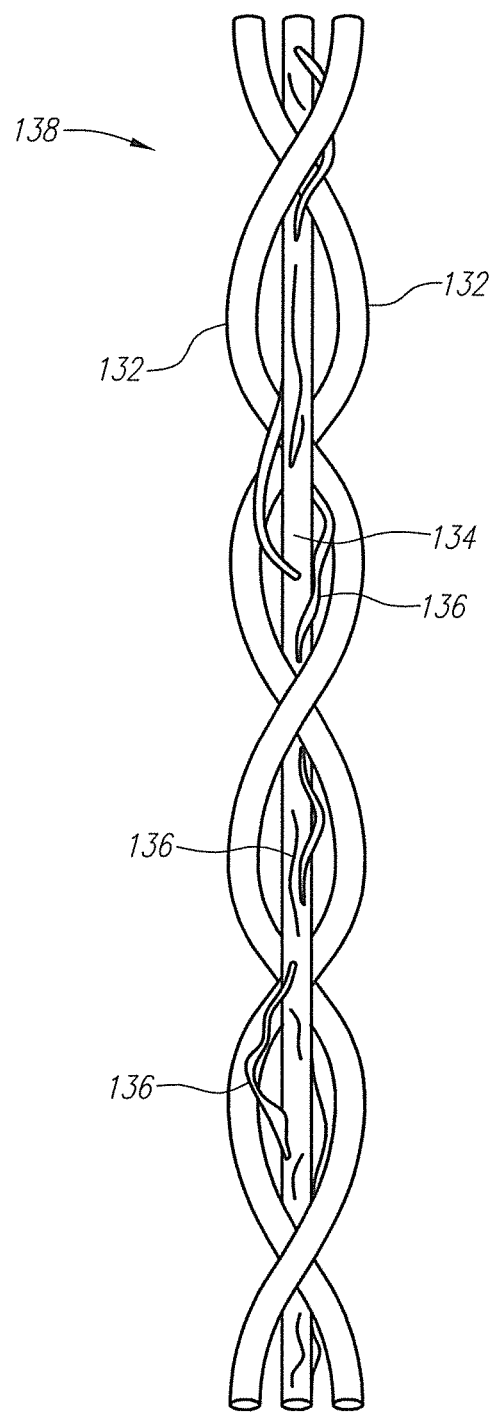
FIG. 5 is a fiber band having both standard roving strands and blown roving strands.

If a percentage of blown roving strands 134 is used in conjunction with standard roving strands 132 to make up a fiber band 138 (FIG. 5) laid down by a filament winding machine, the fiber strand loops 136 of the blown roving strands inter-mingle between filament wound layers that have been laid down to create enhanced interlaminar strength. With reference to FIG. 5, a fiber band 138 comprising three filament strands is shown with two of the strands being standard rovings 132 and one being a blown roving strand 134 formed as an intertwined bundle or band 138. The fiber band 138 is used with a filament winding machine to wind around a removable core or mandrel, which acts as a temporary structure to enable winding. The winding is repeated with each layer laid down at alternating angles or at different angles relative to the axis of the removable core. In some examples, more than three strands are used to form the fiber band 138, which can vary in ratio of 5% to 95% blown roving strands 134 compared to standard roving strands 132. Thus, in one example, there are 4-30 strands of standard roving strands 132 and 3-27 blown roving strands 134 forming the fiber band 138 used for filament winding to form an elongated tube, such as a mandrel and/or a sleeve for use in downhole tools.

Thus, an aspect of the present disclosure is understood to include a fiber band 138 having at least two different types of strands, such as standard roving strands 132 and blown roving strands 134 in a ratio of 5% to 95% blown roving strands with the balance of standard roving strands. The blown roving strands 134 are understood to include undulating loops 136 formed or surrounding a core. In the example shown, the loops are formed by joining strands of different lengths and forcing the ends of the different lengths to meet. A further aspect of the present disclosure is understood to include a method of forming a fiber band 138 having at least two different types of strands, such as standard roving strands 132 and blown roving strands 134 in a ratio of 5% to 95% blown roving strands with the balance of standard roving strands. The method can further comprising winding the fiber band 138 around a temporary core to form a mandrel or a sleeve. The winding of the fiber band 138 can comprise winding each layer laid down at alternating angles or at different angles relative to the axis of the removable core.

Figure 6:
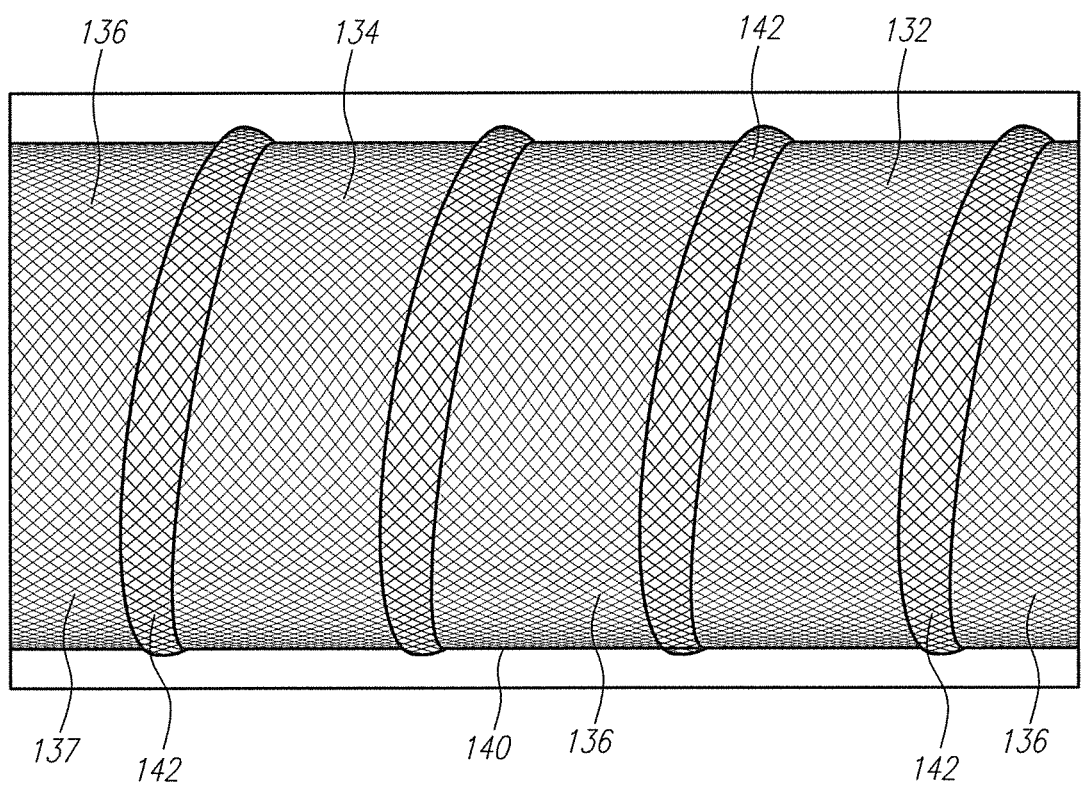
FIG. 6 is a section of a tube, tool, or mandrel manufactured or formed in accordance with the methods and techniques of the present disclosure.

FIG. 6 is a side view of a section of an elongated composite tube 140 formed by filament winding a plurality of fiber bands 138 having strands of both standard rovings 132 and blown roving strands 134. For example, a +/−45 degree layer may be first wound onto the tooling used to make the elongated tube. In other examples, the first layer is wound at a 86 degree angle to within +/−5 degrees. For example, the first layer can be wound at 81 degrees or at 91 degrees or anywhere in between. The first layer 137 has inter-weaving of the fibers as the material is laid down in +45 degree and then −45 degree orientation (or −45 then +45 degree orientation). The next layer 137 is then applied over the top of the prior layer 137 until adequate thickness is achieved, which can range from 0.25 inches to 1.5 inches or on standard 5.5 inch casing plugs and significantly more for larger casing plugs. In other examples, different winding angles are used, for example anywhere from +/−25 degrees to +/−60 degrees. The layers 137, when cured with resin as a matrix for holding the bands 138 together, have much stronger interlaminar strength, i.e., strength between the layers 137, due to the numerous strand loops 136 that span between the layers 137 to act as multiple composite links or bridges that join the layers together. The interlaminar strength of the disclosed composite tube formed by fiber bands 138 comprising standard rovings 132 and blown rovings 134 is much stronger than layers formed with just standard strands and resin and without strand loops 136, which are shown laid down by the resin used to hold the bands.

Also shown in FIG. 6 is an over-layer 142 that is wound at a different angle, such as 3-10 degrees, than the base layers 137 to increase the shear strength of the composite tube connection to bonded sleeves.

Figure 7:
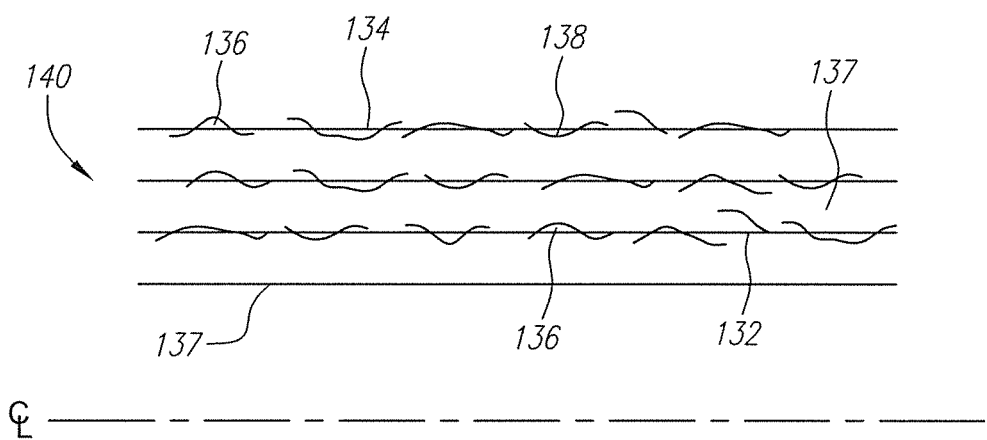
FIG. 7 is a cross-sectional side view of a section of the tube of FIG. 6, which shows the fiber loops bridging between the wound layers.

FIG. 7 is a schematic cross-sectional side view of a section of the composite tube 140 of FIG. 6. As shown, the fiber loops 136 bridge across between wound layers 137. In other words, fiber loops 136 are captured between the layers 137 inside the resin. In a composite, it is the fiber that creates the strength and the resin is what holds the fibers together. The ratio of blown roving strands and standard roving strands used to create the fiber lay-down band when winding can be tailored to meet the interlaminar shear strength requirements for the composite tube application. For example, frac and bridge plug applications may require different blends of standard to blown roving strands and different tube thicknesses. Tests have shown that the shear strength between the layers can easily be increased by 20% or more by using the disclosed method involving winding of fiber bands 138 comprising both standard roving strands and blown roving strands in different ratios to form the disclosed mandrel or composite tube. This increase in strength can make the frac or bridge plug suitable for higher temperature and/or higher pressure down-hole applications in a cost effective way.

Strands of blown roving can also be interspersed between layers of woven cloth as the cloth is convolute wrapped as a means to enhance the interlaminar shear strength between layers of cloth by incorporating fiber loops that bridge between the layers. Thus, an aspect of the present disclosure is a composite mandrel, sleeve, or both comprising woven cloth with the cloth having blown roving strands interspersed therein. A further aspect of the present disclosure is a method for forming a mandrel, a sleeve, or both comprising convolute wrapping a plurality of layers around a removable core with woven cloth and wherein the woven cloth comprises blown roving strands interspersed therein.

Although limited methods and embodiments for forming a composite tube or mandrel using a blend of standard and blown roving strands and their components have been specifically described and illustrated herein, many modifications and variations will be apparent to those skilled in the art. Also, well known processes within the composite manufacturing industry has not been described, such as curing time and temperature and the type of resins that can be used. Similarly, while glass, carbon fiber and other specific composite materials have been identified, other commercially available fibers may be used provided fiber bands comprising blown fiber rovings are incorporated. Accordingly, it is to be understood that the composite tube or mandrel for high pressure and temperature applications constructed according to principles of the disclosed device, system, and method may be embodied other than as specifically described herein. The disclosure is also defined in the following claims.

The invention claimed is:
1. A mandrel made of a composite material comprising:
fiber bands forming plurality of filament wound layers that include a first filament wound layer and a second filament wound layer defining an elongated body with a hollow core;
each of the first filament wound layer and the second filament wound layer comprising a first strand of the fiber bands comprising a standard roving strand substantially without strand loops;
each of the first filament wound layer and the second filament wound layer comprising a second strand of the fiber bands comprising a blown roving strand having strand loops surrounding a core bridging between the plurality of filament wound layers of the elongated body to enhance interlaminar shear strength; and resin for binding the first and second filament wound layers;

wherein the standard roving strand of the first filament would layer and the blown roving strand of the second filament wound layer are intermingled to form an intertwined bundle; and wherein the blown roving strand of the first filament wound layer are intermingled with the blown roving strand of the second filament wound layer.

2. The mandrel of claim 1, wherein a first layer of fiber band is wound at 86 degree angle relative to a lengthwise axis of the elongate body to within +/−5 degrees.

3. The mandrel of claim 2, wherein a second layer of fiber band is wound at −45 degree angle relative to a lengthwise axis of the elongate body.

4. The mandrel of claim 1, wherein the mandrel is part of a frac or bridge plug down-hole tool.

5. The mandrel of claim 1, further comprising a resin matrix that binds the different bands together.

6. The mandrel of claim 1, further comprising a sleeve wound to the mandrel and wherein the sleeve comprises strand loops bridging between filament wound layers for forming the sleeve.

7. The mandrel of claim 1, wherein the fiber bands are formed of the standard roving strand and the blown roving strand intermingled in a ratio of 5% to 95% of the blown roving strand compared to the standard roving strand.

8. The mandrel of claim 7, wherein the intertwined bundle is formed of two strands of the standard roving strand and one strand of the blown roving strand.

9. The mandrel of claim 1, wherein the blown roving strand of at least one of the first filament wound layer and the second filament wound layer comprises a section having sectional portions of individual strands each having different lengths respectively.

10. A method of filament winding a down-hole product comprising:

using blown glass fiber roving strands comprising strand loops with standard roving strands substantially without strand loops as fiber bands, the standard roving strands and the blown glass roving strands of the first filament would layer and the second filament wound layer being intermingled to form an intertwined bundle; and winding a plurality of filament wound layers using the fiber bands to form the down-hole product having a body, the plurality of filament wound layers include a first filament wound layer and a second filament wound layer, and enhanced interlaminar shear strength;

wherein the blown glass fiber roving strands of the first filament wound layer are intermingled with the blown glass fiber roving strands of the second filament wound layer inside a resin matrix.

11. The method of claim 10, further comprising forming an enlarged sleeve at an end of the down-hole product, the enlarged sleeve comprising a composite layer having blown glass fiber roving strands comprising strand loops with standard roving strands.

12. The method of claim 10, wherein the down-hole product is a mandrel comprising an elongated body comprising a bore.

13. The method of claim 10, further comprising a final over-layer wound at a different angle than angles used to form the plurality of filament wound layers.

14. The method of claim 13, wherein the final over-layer is wound at around a 3 to 10 degree angle relative to a lengthwise axis of the body.

15. The method of claim 10, wherein the down-hole product is a sleeve comprising the body with a bore.

* * * * *